United States Patent
Shen et al.

(10) Patent No.: US 11,729,599 B2
(45) Date of Patent: Aug. 15, 2023

(54) COMMUNICATION SYSTEM

(71) Applicant: NOKIA TECHNOLOGIES OY, Espoo (FI)

(72) Inventors: Yang Shen, Beijing (CN); Xuan He, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 299 days.

(21) Appl. No.: 17/280,010

(22) PCT Filed: Oct. 8, 2018

(86) PCT No.: PCT/CN2018/109322
§ 371 (c)(1),
(2) Date: Mar. 25, 2021

(87) PCT Pub. No.: WO2020/073161
PCT Pub. Date: Apr. 16, 2020

(65) Prior Publication Data
US 2022/0038884 A1 Feb. 3, 2022

(51) Int. Cl.
*H04W 8/06* (2009.01)
*H04W 12/02* (2009.01)
*H04W 48/18* (2009.01)

(52) U.S. Cl.
CPC .............. *H04W 8/06* (2013.01); *H04W 12/02* (2013.01); *H04W 48/18* (2013.01)

(58) Field of Classification Search
CPC ....... H04W 8/06; H04W 12/02; H04W 48/18; H04W 64/00; H04W 4/08; H04W 4/20; H04W 12/63; H04W 4/02; H04W 8/02
See application file for complete search history.

(56) References Cited

U.S. PATENT DOCUMENTS 10,375,225 B2 * 8/2019 Yadav ............... H04M 1/72448
10,856,255 B2 * 12/2020 Pudney ................. H04W 72/51
(Continued)

FOREIGN PATENT DOCUMENTS

CN      1898986 A      1/2007
CN    101198149 A      6/2008
(Continued)

OTHER PUBLICATIONS

Extended European Search Report for European Application No. 18936530.7 dated May 10, 2022, 9 pages.
(Continued)

*Primary Examiner* — Julio R Perez
(74) *Attorney, Agent, or Firm* — Alston & Bird LLP

(57) ABSTRACT

A system comprising means for: receiving a request for locations of a plurality of devices for communicating in a network, said request comprising an identifier for identifying said plurality of devices; checking whether each of two or more devices of said identified plurality of devices has been registered on the network; in response to determining that at least one device of the two or more devices has been registered on the network, determining and reporting at least one location for the at least one device determined to be registered on the network; and in response to determining that at least one device of the two or more devices has not been registered on the network, storing at least one indication of at least one pending request for at least one location of the at least one device not registered on the network.

20 Claims, 15 Drawing Sheets

(56) References Cited

U.S. PATENT DOCUMENTS

| | | | | |
|---|---|---|---|---|
| 11,151,856 | B2* | 10/2021 | Miniard | G08B 21/0261 |
| 11,515,980 | B1* | 11/2022 | Zhang | H04L 5/005 |
| 2005/0136926 | A1* | 6/2005 | Tammi | H04W 8/26 455/435.2 |
| 2008/0280607 | A1* | 11/2008 | Kanto | H04W 60/04 455/435.1 |
| 2014/0219245 | A1* | 8/2014 | Webb | H04L 47/10 370/331 |
| 2017/0195833 | A1* | 7/2017 | Chami | H04W 4/029 |
| 2019/0159160 | A1* | 5/2019 | Albasheir | H04W 36/36 |
| 2022/0046425 | A1* | 2/2022 | Edge | H04B 7/1855 |

FOREIGN PATENT DOCUMENTS

| | | |
|---|---|---|
| EP | 1 560 453 A2 | 8/2005 |
| WO | WO 2009/089085 A1 | 7/2009 |
| WO | WO 2012/021871 A1 | 2/2012 |
| WO | WO 2013/170723 A1 | 11/2013 |
| WO | WO 2014/194300 A1 | 12/2014 |
| WO | WO 2018/080681 A1 | 5/2018 |

OTHER PUBLICATIONS

"3rd Generation Partnership Project; Technical Specification Group Services and System Aspects; Functional Stage 2 Description of Location Services (LCS) (Release 15)", 3GPP TS 23.271 v15.1.0, (Sep. 2018), 184 pages.

First Examination Report for Indian Application No. 202147019533 dated Feb. 22, 2022, 7 pages.

3GPP TR 23.716 v1.0.0, "3rd Generation Partnership Project; Technical Specification Group Services and System Aspects; Study on the Wireless and Wireline Convergence for the 5G System Architecture (Release 16)", (Sep. 2018), 134 pages.

3GPP TR 23.731 v0.6.0, "3rd Generation Partnership Project; Technical Specification Group Services and System Aspects; Study on Enhancement to the 5GC Location Services (Release 16)", (Aug. 2018), 144 pages.

3GPP TS 22.071 v15.0.0, "3rd Generation Partnership Project; Technical Specification Group Services and System Aspects; Location Services (LCS); Service Description; Stage 1 (Release 15)", (Jun. 2018), 55 pages.

3GPP TS 22.261 v16.5.0, "3rd Generation Partnership Project; Technical Specification Group Services and System Aspects; Service Requirements for the 5G System; Stage 1 (Release 16)", (Sep. 2018), 67 pages.

3GPP TS 23.501 v15.3.0, "3rd Generation Partnership Project; Technical Specification Group Services and System Aspects; System Architecture for the 5G System; Stage 2 (Release 15)", (Sep. 2018), 226 pages.

3GPP TS 23.502 v15.3.0, "3rd Generation Partnership Project; Technical Specification Group Services and System Aspects; Procedures for the 5G System; Stage 2 (Release 15)", (Sep. 2018), 330 pages.

3GPP TS 23.503 v15.3.0, "3rd Generation Partnership Project; Technical Specification Group Services and System Aspects; Policy and Charging Control Framework for the 5G System; Stage 2 (Release 15)", (Sep. 2018), 70 pages.

International Search Report and Written Opinion for Patent Cooperation Treaty Application No. PCT/CN2018/109322 dated Jun. 28, 2019, 6 pages.

Office Action for Chinese Application No. 201880098481.0 dated Sep. 23, 2022, 10 pages.

\* cited by examiner

COMMUNICATION SYSTEM

CROSS-REFERENCE TO RELATED APPLICATIONS

This application is a national phase entry of International Application No. PCT/CN2018/109322, filed Oct. 8, 2018, the entire contents of which are incorporated herein by reference.

FIELD OF THE INVENTION

This disclosure relates to a method and system, and in particular but not exclusively to a method and system for processing requests for device location.

BACKGROUND

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

SUMMARY

According to a first aspect, there is provided a system comprising means for: receiving a request for locations of a plurality of devices for communicating in a network, said request comprising an identifier for identifying said plurality of devices; checking whether each of two or more devices of said identified plurality of devices has been registered on the network; in response to determining that at least one device of the two or more devices has been registered on the network, determining and reporting at least one location for the at least one device determined to be registered on the network; and in response to determining that at least one device of the two or more devices has not been registered on the network, storing in memory at least one indication of at least one pending request for at least one location of the at least one device not registered on the network.

In some embodiments, the identifier comprises at least one of: a group identifier identifying a group comprising the plurality of devices; a location identifier identifying an area comprising the plurality of devices; and a network slice identifier identifying a network slice comprising the plurality of devices.

In some embodiments, the system comprises means for, in response to determining that a device of the at least one device for which a pending request was stored has subsequently been registered on the network, determining and reporting a location for the device subsequently registered on the network.

In some embodiments, the determining and reporting the location for the device subsequently registered on the network comprises fetching the respective pending request from the memory and servicing the respective pending request.

In some embodiments, the system comprises means for: using the identifier to identify at least one privacy setting associated with the plurality of devices; and performing a first check of the at least one privacy setting, wherein the determining and reporting of the at least one location for the at least one device registered on the network is performed in response to determining from the first check that the at least one privacy setting allows location reporting for the at least one device registered on the network.

In some embodiments, the system comprises means for: using the identifier to identify at least one privacy setting associated with the plurality of devices; and performing a first check of the at least one privacy setting, wherein the checking whether each of the two or more devices of said identified plurality of devices has been registered on the network is performed in response to determining from the first check that the at least one privacy setting allows location reporting for the two or more devices.

In some embodiments, the system comprises means for performing a second check of the at least one privacy setting associated with the plurality of devices, wherein the determining and reporting of the location for the device subsequently registered on the network is performed in response to determining from the second check that the at least one privacy setting allows location reporting for the device subsequently registered on the network.

In some embodiments, the at least one privacy setting comprises a single privacy setting that applies to all of the plurality of devices.

In some embodiments, the at least one privacy setting comprises a plurality of privacy settings, each of which applies to at least one of the plurality of devices.

In some embodiments, the at least one pending request comprises a periodic request for locations of the at least one device not registered on the network.

According to a second aspect, there is provided a method comprising: receiving a request for locations of a plurality of devices for communicating in a network, said request comprising an identifier for identifying said plurality of devices; checking whether each of two or more devices of said identified plurality of devices has been registered on the network; in response to determining that at least one device of the two or more devices has been registered on the network, determining and reporting at least one location for the at least one device determined to be registered on the network; and in response to determining that at least one device of the two or more devices has not been registered on the network, storing in memory at least one indication of at least one pending request for at least one location of the at least one device not registered on the network.

In some embodiments, the identifier comprises at least one of: a group identifier identifying a group comprising the plurality of devices; a location identifier identifying an area comprising the plurality of devices; and a network slice identifier identifying a network slice comprising the plurality of devices.

In some embodiments, the method comprises, in response to determining that a device of the at least one device for which a pending request was stored has subsequently been registered on the network, determining and reporting a location for the device subsequently registered on the network.

In some embodiments, the determining and reporting the location for the device subsequently registered on the network comprises fetching the respective pending request from the memory and servicing the respective pending request.

In some embodiments, the method comprises: using the identifier to identify at least one privacy setting associated with the plurality of devices; and performing a first check of the at least one privacy setting, wherein the determining and reporting of the at least one location for the at least one device registered on the network is performed in response to determining from the first check that the at least one privacy setting allows location reporting for the at least device registered on the network.

In some embodiments, the method comprises: using the identifier to identify at least one privacy setting associated with the plurality of devices; and performing a first check of the at least one privacy setting, wherein the checking whether each of the two or more devices of said identified plurality of devices has been registered on the network is performed in response to determining from the first check that the at least one privacy setting allows location reporting for the two or more devices.

In some embodiments, the method comprises performing a second check of the at least one privacy setting associated with the plurality of devices, wherein the determining and reporting of the location for the device subsequently registered on the network is performed in response to determining from the second check that the at least one privacy setting allows location reporting for the device subsequently registered on the network.

In some embodiments, the at least one privacy setting comprises a single privacy setting that applies to all of the plurality of devices.

In some embodiments, the at least one privacy setting comprises a plurality of privacy settings, each of which applies to at least one of the plurality of devices.

In some embodiments, the at least one pending request comprises a periodic request for locations of the at least one device not registered on the network.

According to a third aspect, there is provided a computer program comprising instructions for causing an apparatus to perform at least: receiving a request for locations of a plurality of devices for communicating in a network, said request comprising an identifier for identifying said plurality of devices; checking whether each of two or more devices of said identified plurality of devices has been registered on the network; in response to determining that at least one device of the two or more devices has been registered on the network, determining and reporting at least one location for the at least one device determined to be registered on the network; and in response to determining that at least one device of the two or more devices has not been registered on the network, storing in memory at least one indication of at least one pending request for at least one location of the at least one device not registered on the network.

In some embodiments, the identifier comprises at least one of: a group identifier identifying a group comprising the plurality of devices; a location identifier identifying an area comprising the plurality of devices; and a network slice identifier identifying a network slice comprising the plurality of devices.

In some embodiments, the computer program comprising instructions for causing an apparatus to perform at least, in response to determining that a device of the at least one device for which a pending request was stored has subsequently been registered on the network, determining and reporting a location for the device subsequently registered on the network.

In some embodiments, the determining and reporting the location for the device subsequently registered on the network comprises fetching the respective pending request from the memory and servicing the respective pending request.

In some embodiments, the computer program comprising instructions for causing an apparatus to perform at least: using the identifier to identify at least one privacy setting associated with the plurality of devices; and performing a first check of the at least one privacy setting, wherein the determining and reporting of the at least one location for the at least one device registered on the network is performed in response to determining from the first check that the at least one privacy setting allows location reporting for the at least device registered on the network.

In some embodiments, the computer program comprising instructions for causing an apparatus to perform at least: using the identifier to identify at least one privacy setting associated with the plurality of devices; and performing a first check of the at least one privacy setting, wherein the checking whether each of the two or more devices of said identified plurality of devices has been registered on the network is performed in response to determining from the first check that the at least one privacy setting allows location reporting for the two or more devices.

In some embodiments, the computer program comprising instructions for causing an apparatus to perform at least performing a second check of the at least one privacy setting associated with the plurality of devices, wherein the determining and reporting of the location for the device subsequently registered on the network is performed in response to determining from the second check that the at least one privacy setting allows location reporting for the device subsequently registered on the network.

In some embodiments, the at least one privacy setting comprises a single privacy setting that applies to all of the plurality of devices.

In some embodiments, the at least one privacy setting comprises a plurality of privacy settings, each of which applies to at least one of the plurality of devices.

In some embodiments, the at least one pending request comprises a periodic request for locations of the at least one device not registered on the network.

According to a fourth aspect, there is provided a non-transitory computer readable medium comprising program instructions for causing an apparatus to perform at least the following: receiving a request for locations of a plurality of devices for communicating in a network, said request comprising an identifier for identifying said plurality of devices; checking whether each of two or more devices of said identified plurality of devices has been registered on the network; in response to determining that at least one device of the two or more devices has been registered on the network, determining and reporting at least one location for the at least one device determined to be registered on the network; and in response to determining that at least one device of the two or more devices has not been registered on the network, storing in memory at least one indication of at least one pending request for at least one location of the at least one device not registered on the network.

In some embodiments, the non-transitory computer readable medium may comprise instructions for causing an apparatus to perform at least any of the steps of the examples described between the above-mentioned second and third aspects.

According to a fifth aspect, there is provided a system comprising at least one processor, and at least one memory including computer program code, wherein the at least one memory and the computer program code are configured, with the at least one processor, to cause the system to: receive a request for locations of a plurality of devices for communicating in a network, said request comprising an identifier for identifying said plurality of devices; check whether each of two or more devices of said identified plurality of devices has been registered on the network; in response to determining that at least one device of the two or more devices has been registered on the network, determine and report at least one location for the at least one device determined to be registered on the network; and in response to determining that at least one device of the two or more devices has not been registered on the network, store at least one indication of at least one pending request for at least one location of the at least one device not registered on the network.

In some embodiments, the identifier comprises at least one of: a group identifier identifying a group comprising the plurality of devices; a location identifier identifying an area comprising the plurality of devices; and a network slice identifier identifying a network slice comprising the plurality of devices.

In some embodiments, the at least one memory and the computer program code are configured, with the at least one processor, to cause the system to, in response to determining that a device of the at least one device for which a pending request was stored has subsequently been registered on the network, determining and reporting a location for the device subsequently registered on the network.

In some embodiments, the determining and reporting the location for the device subsequently registered on the network comprises fetching the respective pending request from the memory and servicing the respective pending request.

In some embodiments, the at least one memory and the computer program code are configured, with the at least one processor, to cause the system to: using the identifier to identify at least one privacy setting associated with the plurality of devices; and performing a first check of the at least one privacy setting, wherein the determining and reporting of the at least one location for the at least one device registered on the network is performed in response to determining from the first check that the at least one privacy setting allows location reporting for the at least device registered on the network.

In some embodiments, the at least one memory and the computer program code are configured, with the at least one processor, to cause the system to: using the identifier to identify at least one privacy setting associated with the plurality of devices; and performing a first check of the at least one privacy setting, wherein the checking whether each of the two or more devices of said identified plurality of devices has been registered on the network is performed in response to determining from the first check that the at least one privacy setting allows location reporting for the two or more devices.

In some embodiments, the at least one memory and the computer program code are configured, with the at least one processor, to cause the system to perform a second check of the at least one privacy setting associated with the plurality of devices, wherein the determining and reporting of the location for the device subsequently registered on the network is performed in response to determining from the second check that the at least one privacy setting allows location reporting for the device subsequently registered on the network.

In some embodiments, the at least one privacy setting comprises a single privacy setting that applies to all of the plurality of devices.

In some embodiments, the at least one privacy setting comprises a plurality of privacy settings, each of which applies to at least one of the plurality of devices.

In some embodiments, the at least one pending request comprises a periodic request for locations of the at least one device not registered on the network.

FIGURES

Some embodiments will now be described in further detail, by way of example only, with reference to the following examples and accompanying drawings, in which.

DETAILED DESCRIPTION

Figure 1:
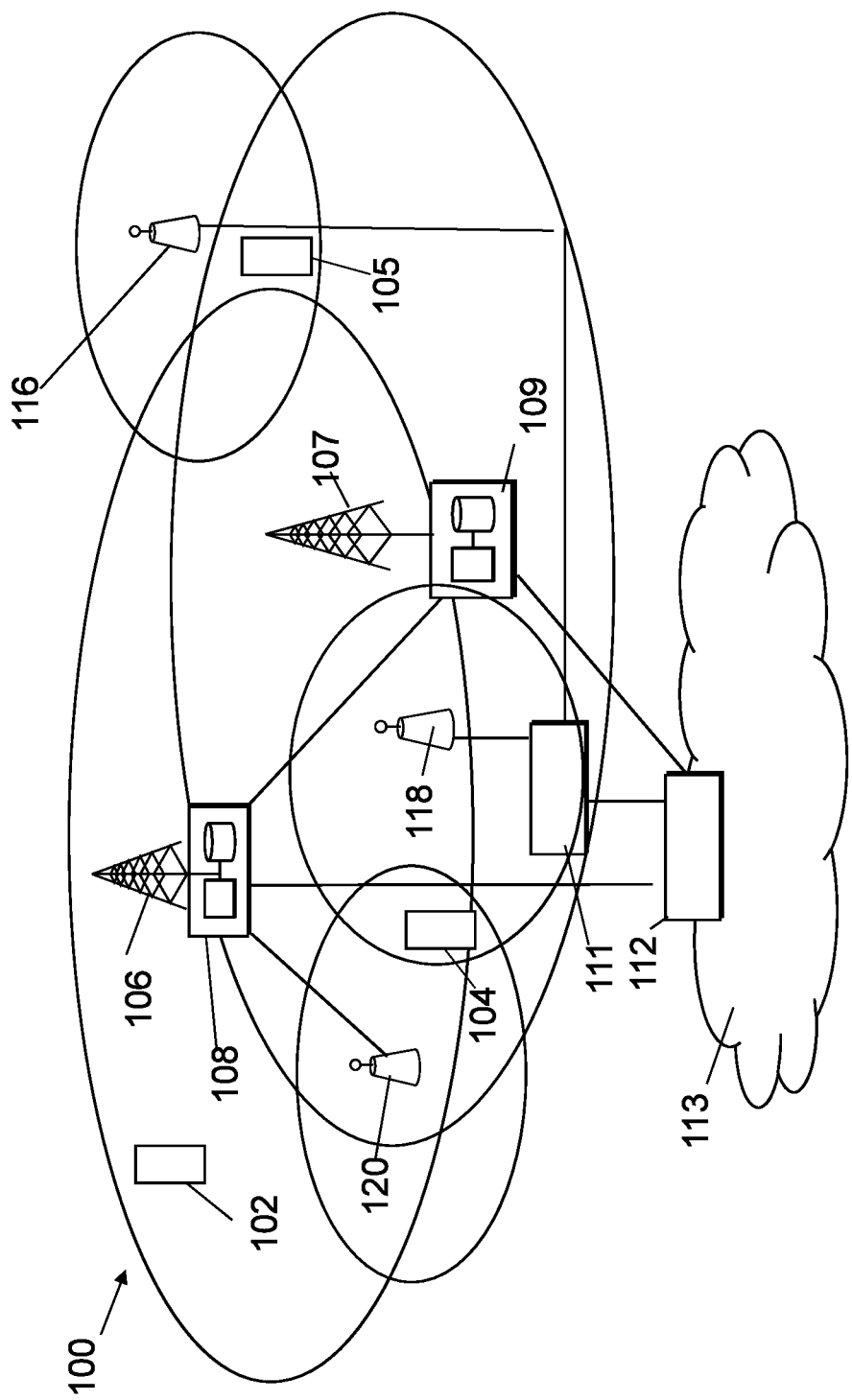
FIG. 1 shows a schematic example of a communication system.

In the following, certain exemplifying embodiments are explained with reference to a wireless communication system serving devices adapted for wireless communication. Before explaining in detail embodiments, certain general principles of a communication system, a communication device and a control apparatus are briefly explained with reference to FIGS. 1 to 3 to assist in understanding the technology underlying the described invention.

In a wireless system at least a part of the communications between at least two stations occurs over wireless interfaces. Examples of wireless systems include public land mobile networks (PLMN), satellite based communication systems and different wireless local networks, for example, wireless local area networks (WLAN). A local area wireless networking technology allowing devices to connect to a data network is known by the tradename Wi-Fi (or WiFi). Wi-Fi is often used synonymously with WLAN.

Wireless systems can be divided into cells, and are therefore often referred to as cellular systems. A user can access a communication system by means of an appropriate communication device or terminal. A communication device of a user is often referred to as user equipment (UE) or user apparatus. A communication device is provided with an appropriate signal receiving and transmitting apparatus for enabling communications, for example, enabling access to a communication network or enabling communications directly with other users. The communication device may access a carrier provided by a station, for example a base station of a cell, and transmit and/or receive communications on the carrier.

A communication system and associated devices typically operate in accordance with a given standard or specification, which sets out what the various entities associated with the system are permitted to do and how that should be achieved. Communication protocols and/or parameters, which shall be used for the connection are also typically defined. An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE is sometimes referred to as LTE Advanced (LTE-A). The various development stages of 3GPP specifications are referred to as releases. In this description 3GPP release versions are distinguished by the acronym "Rel-nn".

In addition to LTE evolution, 3GPP has initiated a study item targeting a new radio generation (5G) called new radio (NR). NR does not require backwards compatibility with LTE. Instead, it aims at tight interworking between the RAT (radio access technology) and LTE. An objective of a NR study item is to identify and develop technology components needed for new radio (NR) systems to use any spectrum band ranging at least up to 100 GHz. The aim may be to achieve a single technical framework addressing usage scenarios, requirements and deployment scenarios defined in, for example, TR 38.913. The new radio access technology may be forward compatible to allow specification in two separate phases (Phase I and Phase II).

Release 16 is an upcoming major release of the 3GPP. Included in Release 16, is an ongoing study item, the scope of which includes the aims of enhancing the service-based architecture used for location based services (i.e. services dependent upon the location of the devices) in the 5G system, and the corresponding Network Functions (NFs) and procedures, so as to meet certain defined service requirements. It is a target to provide location services for both roaming and non-roaming scenarios as well as providing non-3GPP access technologies. Additionally, it is target of the release to support location based services in scenarios involving the interworking of the 5G system and the evolved packet (i.e. 4G) system. A plurality of challenges to overcome so as to achieve these objectives have so far been documented. One of these is the support for IoT UEs. This key issue is derived from the corresponding service requirements for the support of groups of UEs in the 5G network. These requirements are that the 5G network shall optimize the resource use of the control plane and/or user plane to support high connection density (e.g., 1 million connections per square kilometer) of groups of UEs. The 5G system shall support a timely, efficient, and/or reliable mechanism to transmit the same information to multiple UEs.

In a wireless communication system 100, such as that shown in FIG. 1, wireless communication devices, for example, machine-type communications MTC devices 102, 104, 105 are provided wireless access via at least one wireless transmitting and/or receiving wireless infrastructure node or point. Such a node could be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1, base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111, whilst station 120 connects via the controller apparatus 108. In some embodiments, the smaller stations may not be provided.

Figure 2:
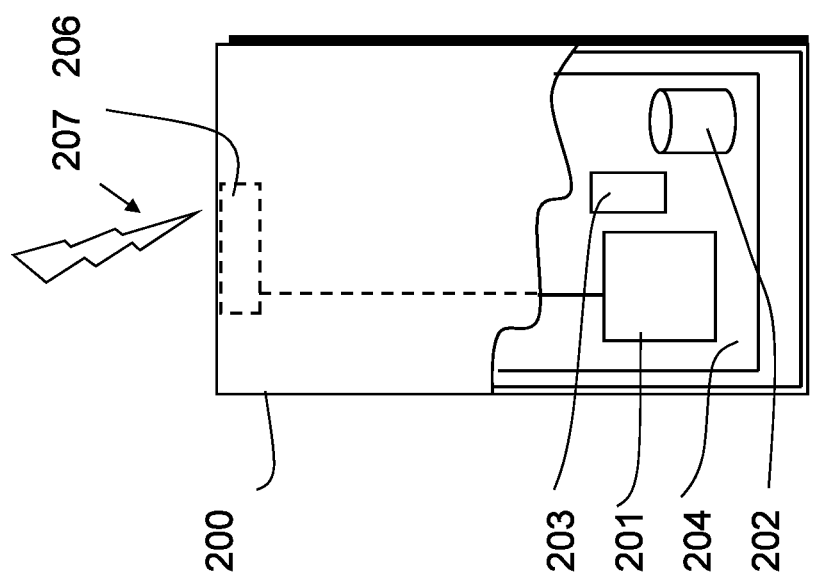
FIG. 2 shows an example of a communication device.

A possible wireless communication device will now be described in more detail with reference to FIG. 2 showing a schematic, partially sectioned view of a communication device 200. Such a communication device 200 is often referred to as an endpoint device. An appropriate communication device 200 may be provided by any device capable of sending and receiving radio signals.

A communication device 200 may be, for example, a mobile device, that is, a device not fixed to a particular location, or it may be a stationary device. The communication device 200 may need human interaction for communication, or may not need human interaction for communication. The communication device 200 may also be referred to hereunder as a terminal, or simply as an apparatus for accessing a network.

The communication device 200 may receive signals over an air or radio interface 207 via appropriate apparatus for receiving and may transmit signals via appropriate apparatus for transmitting radio signals. In FIG. 2, transceiver apparatus is designated schematically by block 206. The transceiver apparatus 206 may be provided for example by means of a radio part and associated antenna arrangement. The antenna arrangement may be arranged internally or externally to the communication device 200.

The communication device 200 is typically provided with at least one data processing entity 201, at least one memory 202 and other possible components 203 for use in the software and hardware aided execution of tasks it is designed to perform, including control of, access to, and communications with, access systems and other communication devices. The data processing, storage and other relevant control apparatus can be provided on an appropriate circuit board and/or in chipsets. This feature is denoted by reference 204. Furthermore, the wireless communication device 200 may comprise appropriate connectors (either wired or wireless) to other devices and/or for connecting external accessories. The communication devices 102, 104, 105 may access the communication system based on various access techniques.

Figure 3:
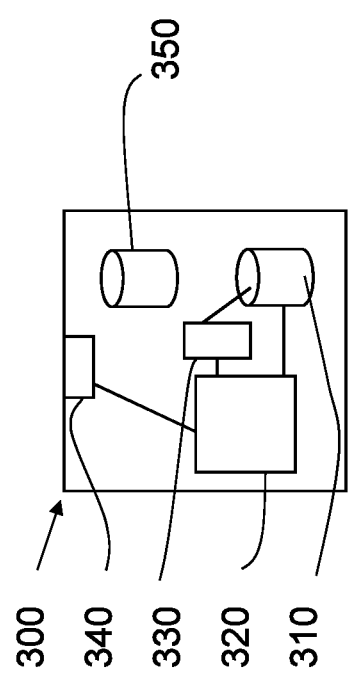
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, (e) node B or 5G AP, or a node of a core network such as an MME, S-GW or AMF, or a server or host. The method may be implemented in a single control apparatus or across more than one control apparatus. The control apparatus 300 may be integrated with or external to a node or module of a core network or RAN. In some embodiments, base stations comprise a separate control apparatus unit or module. In other embodiments, the control apparatus 300 can be another network element such as a radio network controller or a spectrum controller. In some embodiments, each base station may have such a control apparatus 300 as well as a control apparatus 300 being provided in a radio network controller. The control apparatus 300 can be arranged to provide control on communications in the service area of the system. The control apparatus 300 comprises at least one random access memory 310, at least one read only memory 350 at least one data processing unit 320, 330 and an input/output interface 340. Via the interface, the control apparatus can be coupled to a receiver and a transmitter of the base station. The receiver and/or the transmitter may be implemented as a radio front end or a remote radio head.

Architectures for wireless communications systems are standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced NodeBs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a 3GPP development is the 5G concept. Network architecture in 5G may be similar to that of the LTE-advanced. Changes to the network architecture may depend on the need to support various radio technologies, provide finer Quality of Service (QoS) support, and meet certain on-demand requirements for example QoS levels to support Quality of Experience (QoE) from a user point of view. Also network aware services and applications, and service and application aware networks may bring changes to the architecture. Those are related to Information Centric Network (ICN) and User-Centric Content Delivery Network (UC-CDN) approaches. 5G may use multiple input-multiple output (MIMO) antennas, many more base stations or nodes than LTE (a so-called small cell concept), including macro sites operating in co-operation with smaller stations and perhaps also employing a variety of radio technologies for better coverage and enhanced data rates.

The base stations/access points in 5G may be referred to as gNB.

The 5G system is planned to be introduced in the early 2020s, enabling expansion of International Mobile Telecommunications (IMT) that go beyond those of IMT-2000 and IMT-Advanced mobile broadband (MBB) service, and also enabling new services and use cases to be addressed. At least during the initial stages of implementation, cells provided by 5G apparatuses may operate using 4G infrastructure, depending on the service being provided. For example, a 5G network connection may be used for improving on a data throughput, relative to 4G, whilst a 4G connection is used for non-data operations, such as control communications between a user equipment and the network. Network cells operating in such a manner, utilising both types of network, are known as non-standalone cells.

3GPP has developed an architecture and message flow for location services. Location services require the location of one or more communication devices to be determined and reported.

Figure 5:
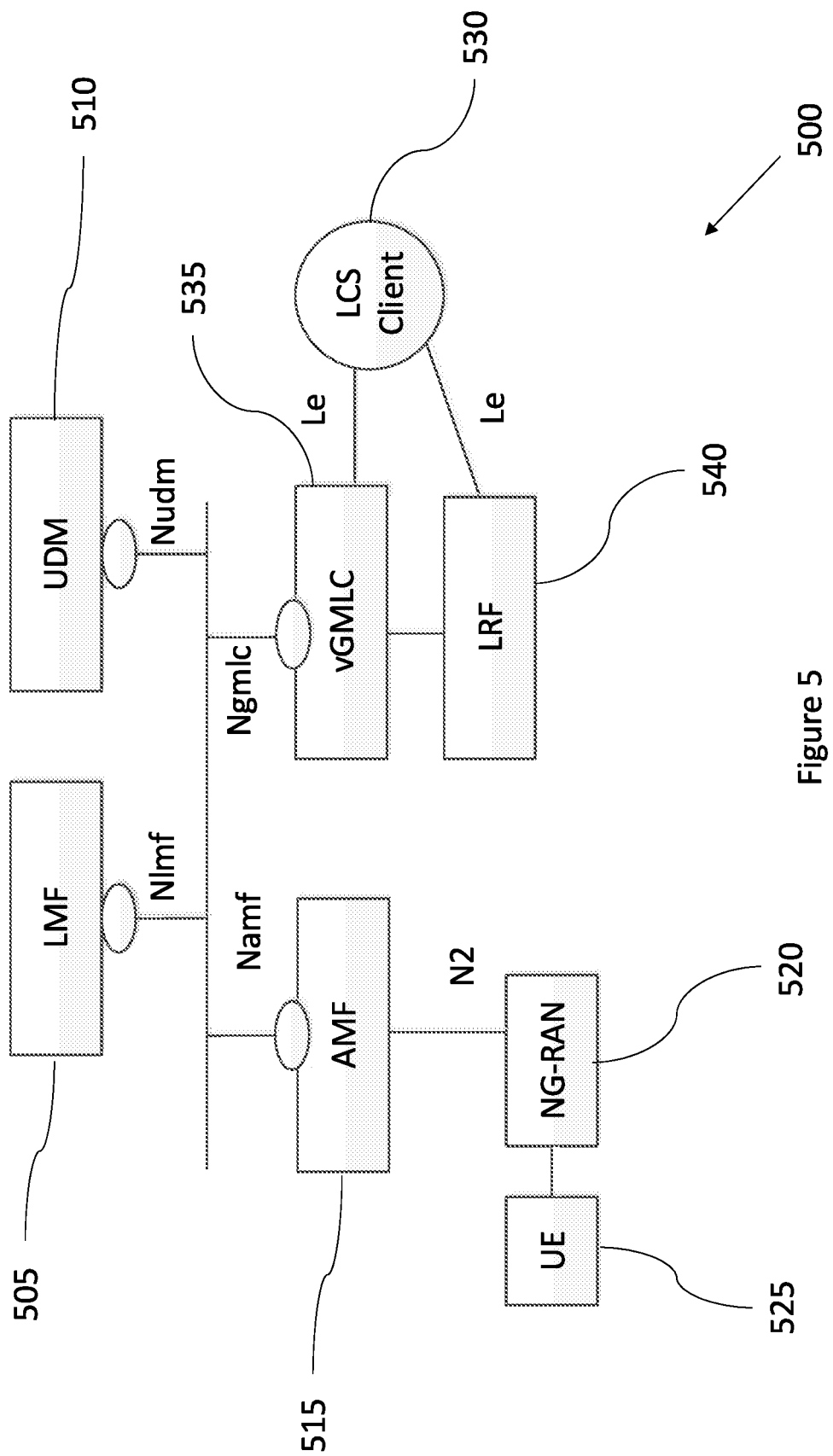
FIG. 5 illustrates an architecture for location services in service based representation.

Reference is made to FIG. 5, which illustrates a non-roaming architecture 500 for providing location services illustrated using a service based interface representation. The Figure illustrates various functions that may be provided by a network in addition to the communication devices and their interfaces to the network. Some of these functions may be provided by a core network. Embodiments of the application may be provided by such a network that provides these functions.

The Location Management Function (LMF) 505 of the architecture 500 is responsible for supporting location determination for a UE, determining downlink or a location estimate from a UE, obtain location measurements from the radio access network, and obtain non-UE assistance data from the radio access network. The Unified Data Management (UDM) function 510 of the architecture 500 stores subscription information and supports the Authentication Credential Repository and Processing Function and stores security credentials used for authentication. The access and mobility management function (AMF) 515 is configured to perform a plurality of tasks including: Registration Management, Connection Management, Reachability Management, Mobility Management and various function relating to security and access management and authorization. The AMF 515 provides these services for devices, such as UE 525, configured to communicate with the core network.

The Radio Access Network (shown as NG-RAN) 520 is configured to provide access to the core network for the UE 525. The radio access network 520 comprises one or more base stations and one or more associated radio network controllers. The UE 525 may be configured to issue request for the location of itself and one or more other UEs (not shown).

There is also provided an external client (or location services client) 530 configured to send and receive communications the core network. The external client 530 may be configured to issue requests for the location of one or more communication devices, such as UE 525. The Gateway Mobile Location Centre (GMLC) 535 contains functionality required to support Location based services, and therefore, interfaces with the external client 535. The location retrieval function (LRF) 540 can be used for retrieving location information for users that initiated an emergency session. This location information may be used to facilitate routing of a call to a suitable public safety answering point.

Figure 6:
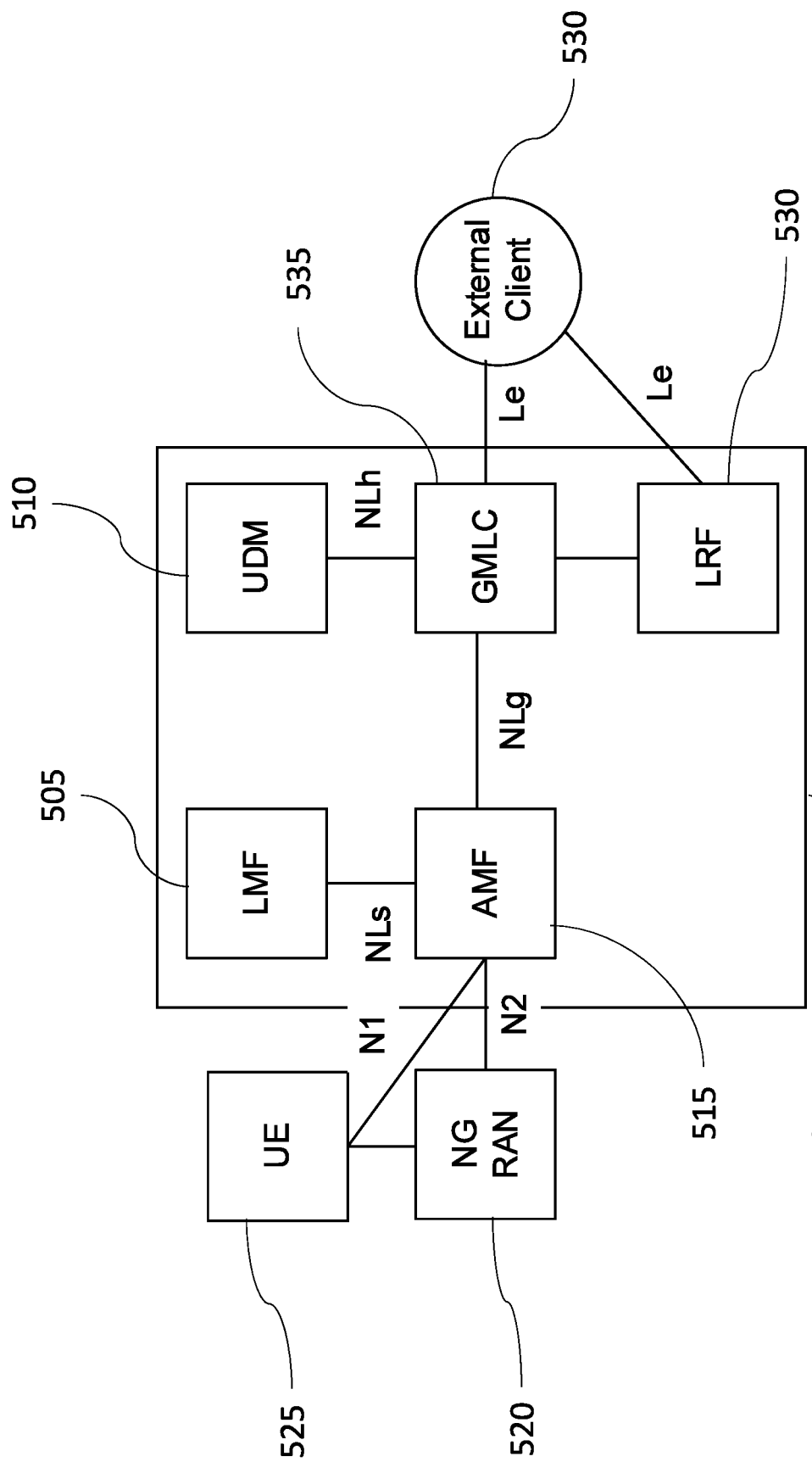
FIG. 6 illustrates an architecture for location services in reference point representation.

Reference is made to FIG. 6, which also illustrates a non-roaming architecture 600 for providing location services. The architecture 600 is illustrated using a reference point representation. This architecture 600 also illustrates how the various network functions interface with each other. In FIGS. 5 and 6, like elements are referred to with like reference numerals. FIG. 6 additionally shows the boundaries of the core network 610.

In some proposed architectures, the location service features provided by the GMLC 535 and LRF 530 are optional and are restricted to regulatory services. In other proposed architectures, location services for commercial purposes may be provided.

The location services may be provided for usage in IoT and in critical communication scenarios. Public Safety is a typical mission critical scenario in which networks should be able to provide critical communication services to entities such as police, fire fighting, civil defense or paramedic services, even in the case that conventional networks cannot meet the required demands.

For example, in the context of policing, street cameras and CCTV systems are continuously capturing video streams, of which a large majority are archived. Sometimes a policing operation and control center needs to monitor and manage a specific area due to crime occurring in that area. The operation and control center may need to manage certain devices, such as CCTV equipment based on their location information. Additionally, the operation and control center may desire to distribute alerts to people within the area. The distribution of the alerts is then dependent upon device locations. The operation and control center, in this example, wishes to distribute alerts only to devices within the area. However, to do so, it is first necessary for the operation and control centre to determine the locations of multiple devices in order to determine which are within the area—and therefore should receive the alerts—and which are outside of the area—and therefore should not receive the alerts.

Another context in which it may be necessary to provide location based services to a plurality of devices is during sports events or concerts. This may be important in order to ensure the safety of attendees of the events. The police and relevant departments may need to determine the locations of user devices, in order to plan evacuation of an event venue, e.g. a stadium. Furthermore, it may be necessary to determine the location of one or more user devices so as to distribute location dependent evacuation guidance to people. Accordingly, from a practical perspective, the public safety network may distribute such evacuation guidance as part of a multicast message to a group of people rather than as a unicast messages.

In these situations, applications/services need to be able to determine the location information of multiple devices in such a way as to enable those applications to provide a timely and efficient services to multiple users.

Therefore, a service application may have the same location service requirements for a plurality of communication devices. Determining the location information of multiple devices in an efficient manner is a problem to be addressed.

One proposal is to initiate multiple location requests for each device of a plurality of devices individually. However, given the number of devices for which the location may need to be determined, it may be very difficult for the application sending the location requests to send individual requests to the network to initiate the location service for all of the communication devices.

A proposal for providing policy requirements of a PDU (Protocol Data Unit) session that apply to multiple devices has been considered. In this proposal the Network Exposure Function (NEF) of the core network is configured to store requests from an application function (AF) of the core network in a selected UDR. The AF requests are stored in the UDR as a subset of the application data. The policy control function (PCF) subscribes to notifications of these AF requests during PDU session establishment or during PDU session modification. However, there are problems related to this proposal that prevent it from being applied to service location requests. Firstly, the location service session makes use of different functions to those used by the PDU session. The network functions involved in a location service procedure are AMF, LMF and GMLC, whereas in a PDU session, the network functions involved are SMF and PCF. Therefore, it is challenging to perform the determination of the location using the PDU session establishment, due to the different functions used by a PDU session and the location service procedure. Secondly, when servicing a location service request relating to a device, it may necessary to consider the privacy setting of the device to be located. The privacy setting may be set so as to enable or disable location reporting for a device. Use of a privacy setting may help to reduce the unnecessary signalling otherwise used to establish the location service session. However, the privacy checking procedure is not carried out as part of a PDU session. This may be especially problematic as a device may at any time modify its privacy setting.

Embodiments of the application address one or more problems with the proposals discussed above by providing a system configured to receive a request for locations of a plurality of devices for communicating in a network, said request comprising an identifier used to identify said plurality of devices. The identifier may be a group ID, identifying a group comprising the plurality of devices. The identifier may be a location ID, identifying a geographical area comprising the plurality of devices. The identifier may be a network slice ID, identifying a network slice comprising the plurality of devices. In all of these cases, the devices may be referenced by a single identifier. Since the devices for which location is requested may be referenced by a single identifier, their location may be requested by sending a single request comprising that identifier.

The system is configured to check, for two or more devices of said identified plurality of devices, whether the respective device has been registered for the network. The system is configured to use the identifier to determine the devices for which this check should be carried out. In response to determining that at least one device of the two or more devices has been registered on the network, the system determines and reports at least one location for the at least one device registered on the network; and in response to determining that at least one device of the two or more devices has not been registered on the network, stores at least one indication of at least one pending request for at least one location of the at least one device not registered on the network. By performing these steps the system is able to service (by determining and reporting the location) the request with respect to any of the devices that are registered on the network, but defer servicing the request for any devices not registered on the network.

Embodiments of the application have the advantage, therefore, that the system is able to receive and service a single location request for a plurality of devices.

The system is configured to, in response to determining that at least one of the devices not registered on the network has subsequently been registered on the network, determine and report at least one location for the at least one device subsequently registered on the network. Therefore, when any of the devices become registered on the system, the system is able to service these requests using the pending requests that were stored for them.

The system is configured to store at least one privacy setting that applies to the plurality of devices. The at least one privacy setting may be a single privacy setting that applies to all of the plurality of devices, i.e. the plurality of devices share the same privacy setting. The at least one privacy setting may be a plurality of privacy settings, each of which applies to a different device of the plurality of devices. The system is configured to, in response to receiving the location request containing the identification of the plurality of devices, look up the at least one privacy setting associated with the identification contained in the request. The system may be configured to service the requests by determining and reporting the at least one location for the at least one device registered on the network in response to determining from a first check that the at least one privacy setting allows location reporting for the at least one device registered on the network. The system may also store the pending request for the at least one device not registered on the network in response to determining from the first check that the at least one privacy setting allows location reporting for the at least one device not registered on the network.

Storing at least one privacy setting associated with an identifier of the plurality of devices allows a single location request for the group of devices to be processed efficiently. This has the advantage of reducing the size of the signalling of the privacy setting checking for a group of devices, since a single identifier may be used to request the privacy setting/s for the whole group.

Since the at least one privacy setting may change, when a device for which a pending request was stored registers on the network, a second check of the at least one privacy setting may be performed. In response to determining from the second check that location reporting is enabled for that device that has subsequently registered on the network, the system is configured to determine and report the location of the device that has subsequently registered on the network. Therefore, any changes to the privacy setting/s that may have taken place since the first check are detected and taken into account when servicing the pending requests. For example, a device of the group may be configured to change the privacy setting/s at any time. Therefore, the system is configured to perform a check of the privacy setting/s, each time a device for which a pending request is stored is registered on the network, so as to detect any changes.

The pending location request may be a periodic location request. In response to the periodic location request, when the at least one device has subsequently registered on the network, the system is configured to periodically determine and report the locations of the at least one device that has subsequently registered.

The devices of the group may share a common characteristic. For example, the devices may all be IoT devices. Additionally or alternatively, the devices of the plurality of devices may be within a predefined geographical area or belong to a specific network slice instance. The system may group the plurality of devices by determining that they share a common characteristic. The grouped plurality of devices may then be identified using a single identifier for requesting the locations of each of them.

The system may comprise one or more components of the core network. These components may provide the network functions—such as UDM, GMLC, AMF, etc—discussed above. The UDM may be configured to store the at least one privacy setting. The GMLC is configured to check the at least one privacy setting in the UDM and send the location service request to the AMF serving a device, which initiates the location request procedure in response.

The location service request may be a mobile terminated location request, in which an external client (such as device of the police or other emergency services) sends the request to the system to determine the location of the devices of the group of devices.

Embodiments of the application will now be explained in more detail with reference to the remaining Figures.

Figure 7:
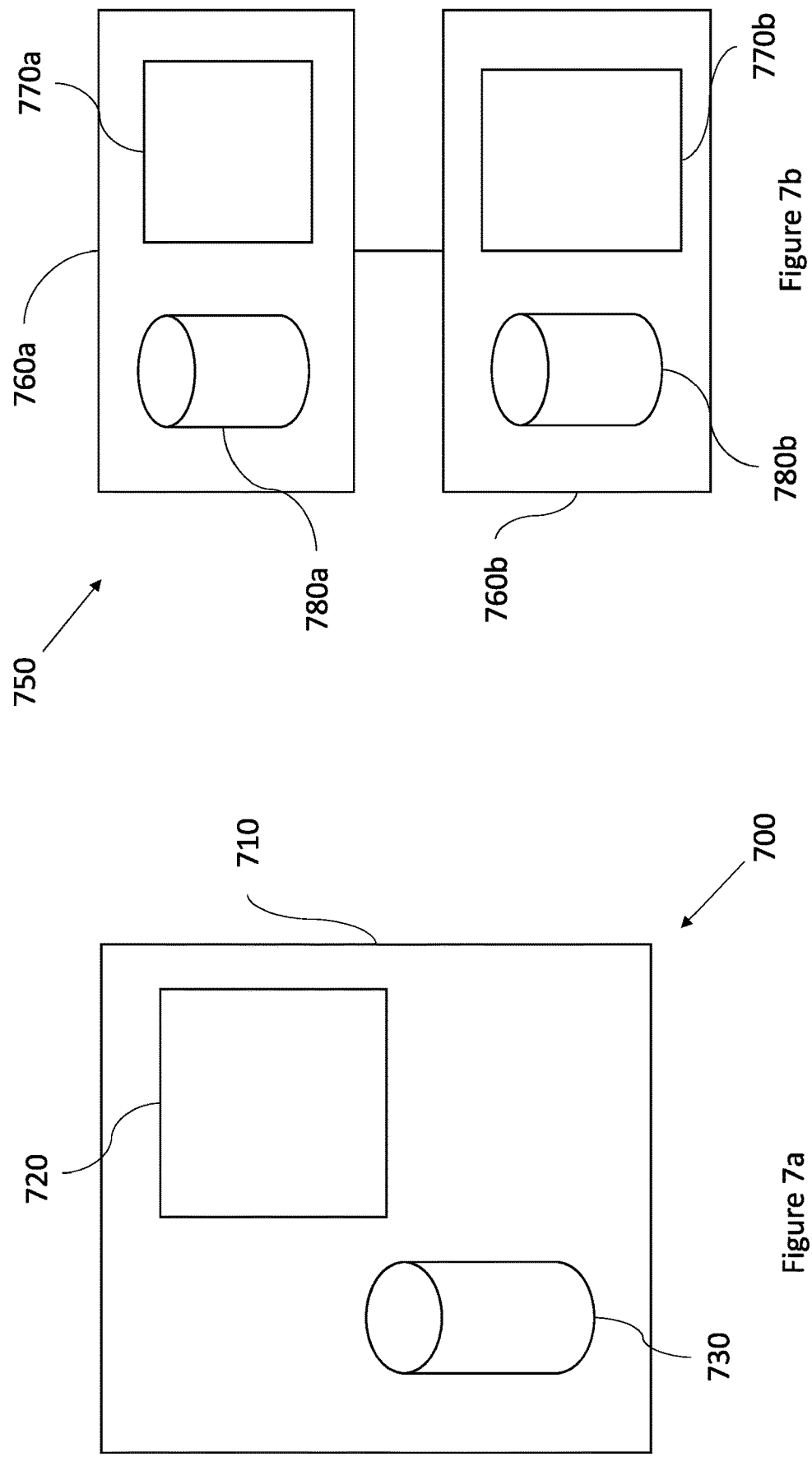
FIG. 7a illustrates an example system where the invention may be implemented.
FIG. 7b illustrates an example system according to embodiments of the application.

Reference is made to FIG. 7a, which illustrates one example of a system 700 that may be used to implement the embodiments of the application. In this case, the system 700 comprises a data processing apparatus 710 comprising one or more processors 720 and one or more memories 730. The one or more processors 720 are configured to, in communication with the one or more memories 730, execute computer code to perform the steps discussed above as being performed by the system 700. The computer code is stored on at least one non-transitory computer readable medium.

Reference is made to FIG. 7b, which illustrates another example of a system 750 that may be used to implement the embodiments of the application. In this case, the system 750 comprises a plurality of data processing systems 760a, 760b, each having one or more processors 770a, 770b and one or more memories 780a, 780b. The one or more processors 770a, 770b are configured to, in communication with the one or more memories 780a, 780b, execute compute code to perform the steps discussed above by the system 750. Again, the computer code is stored on at least one non-transitory computer readable medium.

Therefore, the system according to embodiments of the application may be a unified apparatus 700 as shown in FIG. 7a or a distributed system 750 as shown in FIG. 7b. Either of these systems 700, 750, may be configured to provide one or more network functions of the core network.

Figure 8:
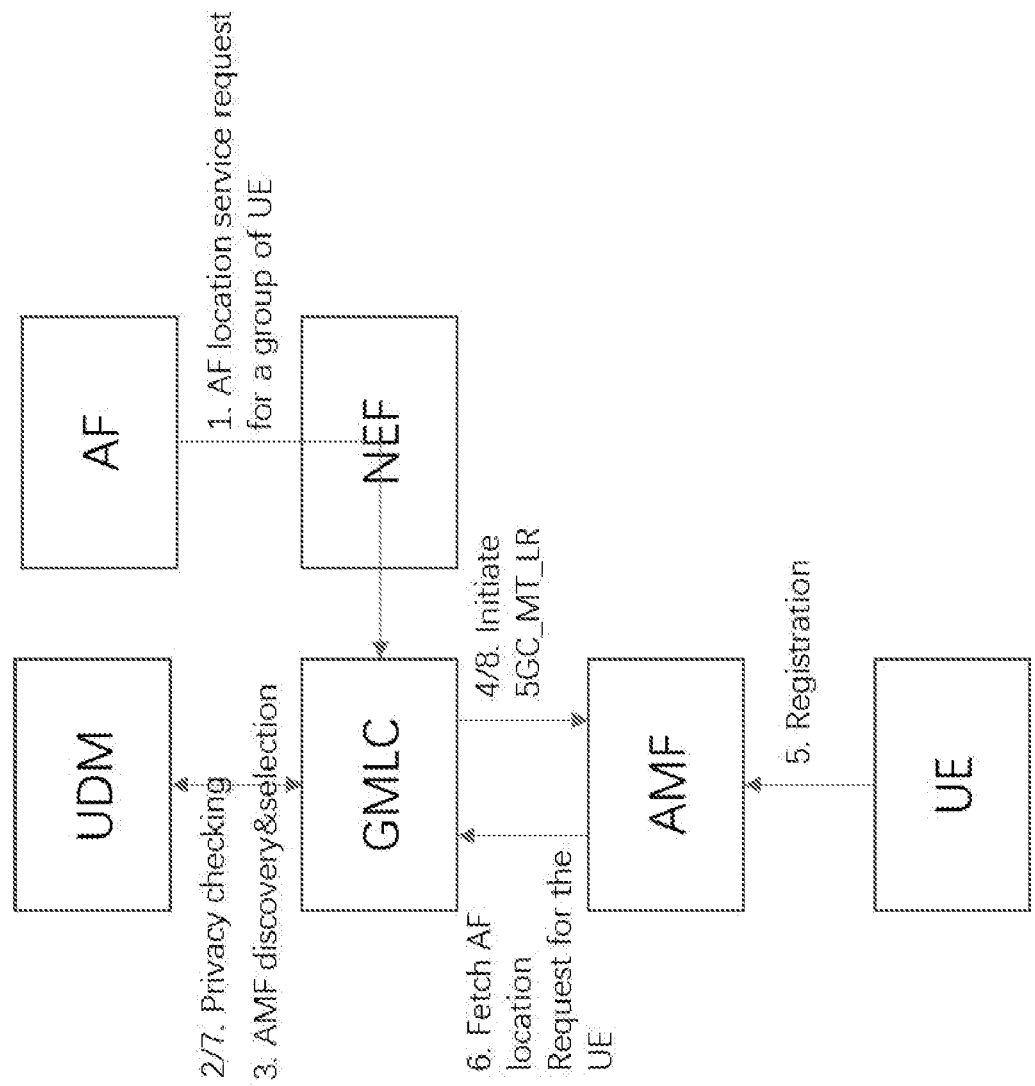
FIG. 8 illustrates an example of the steps performed by network functions of the system.

Reference is made to FIG. 8, which illustrates an example of steps that may be performed by the system according to embodiments of the application. FIG. 8 shows the different network functions that may perform these steps. However, it would be appreciated that this is an example only and that in other examples different network functions may perform the steps shown. FIG. 8 illustrates steps performed in servicing a mobile terminated service request.

At step 1, a location request for the devices of the group of devices is received at the system. The location request is received at the NEF and passed to the GMLC. Alternatively, the location request is directly received by the GMLC, bypassing the NEF.

At step 2, a first check of the at least privacy setting associated with the plurality of devices is performed. The system may be configured to use the identification of the plurality of devices in the location request to access the at least one privacy setting stored in a memory of the system that is associated with the plurality of devices. The system may convert the identification in the location request that is received to an internal identification, which is then used to look up the at least one privacy setting for the plurality of devices. The GMLC may use the identification to access the at least one privacy setting that is stored in the UDM.

At step 3, if it is determined from the first check of the at least one privacy setting that the location services are enabled for at least one of the devices of the plurality of devices, the system performs a check for each device of the at least one device for which location services are enabled to determine whether that device is registered on the network. Each device may be associated with a separate network function for core access (the AMF in this example). In this case, performing the check for each device comprises checking the status of the associated network function stored in the UDM to determine whether the respective device is registered on the network.

At step 4, the system is configured to initiate the location request procedure for at least one device that was determined to be registered on the network in step 3. Initiating the location request procedure for each device may comprise sending an instruction to the network function for the central control of location services (e.g. AMF or LMF) for the respective device. In response, to the receipt of the instruction, the network function for the central control of location services may be configured to communicate with the respective device to determine the device location. In response to determining the device location, the system is configured to report the device location to the requesting client.

At step 5, a device that was determined in step 3 to not have been registered on the network, registers on the network.

At step 6, in response to determining that the device that was not registered on the network has registered on the network, the system is configured to access the pending request for the device that has subsequently registered on the network from memory. This may involve a fetch instruction being sent from the core access network function associated with the device to the GMLC.

At step 7, the system is configured to perform a second check of the at least one privacy setting. This check is performed in response to a determination at step 5 that the device has subsequently been registered on the network. The second check is made so as to ensure that the privacy setting/s that apply to the at least one device that has subsequently been registered on the network has not changed in the time since the first check was made.

At step 8, the system is configured to, in response to determining from the second check that the privacy/s setting indicate that the location services are still enabled for the at least one device that has subsequently registered on the network, initiate the location request procedure for the device that was subsequently registered on the network in step 5.

Figure 9:
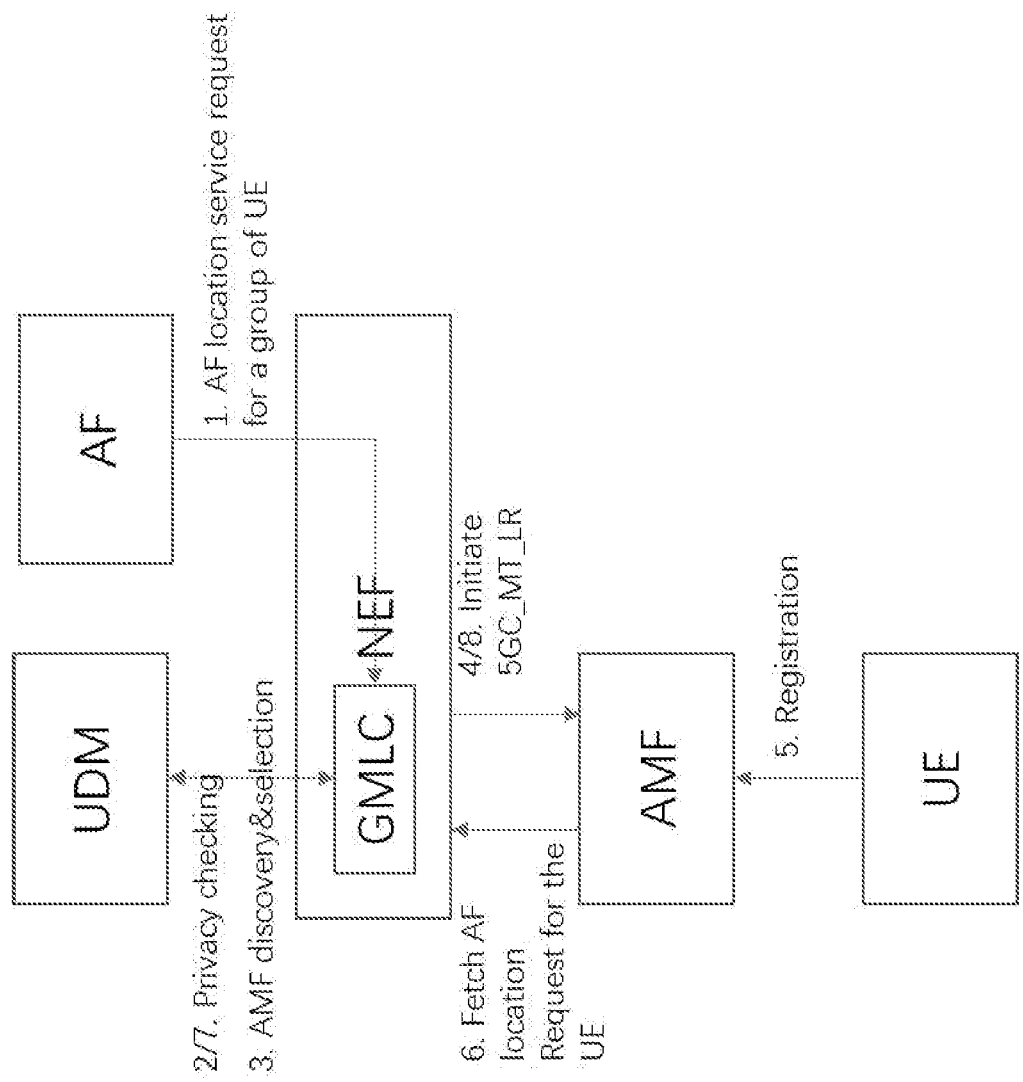
FIG. 9 illustrates an example of the steps performed by network functions of the system.

Reference is made to FIG. 9, which illustrates an example of steps that may be performed by the different network functions of the system according to embodiments of the application.

The steps illustrated in FIG. 9 are unless shown otherwise, the same as those described above with respect to FIG. 8. In this example, however, the GMLC is part of the NEF. Steps 4, 6, and 8, are performed by the NEF communicating the AMFs of the relevant devices.

Figure 10:
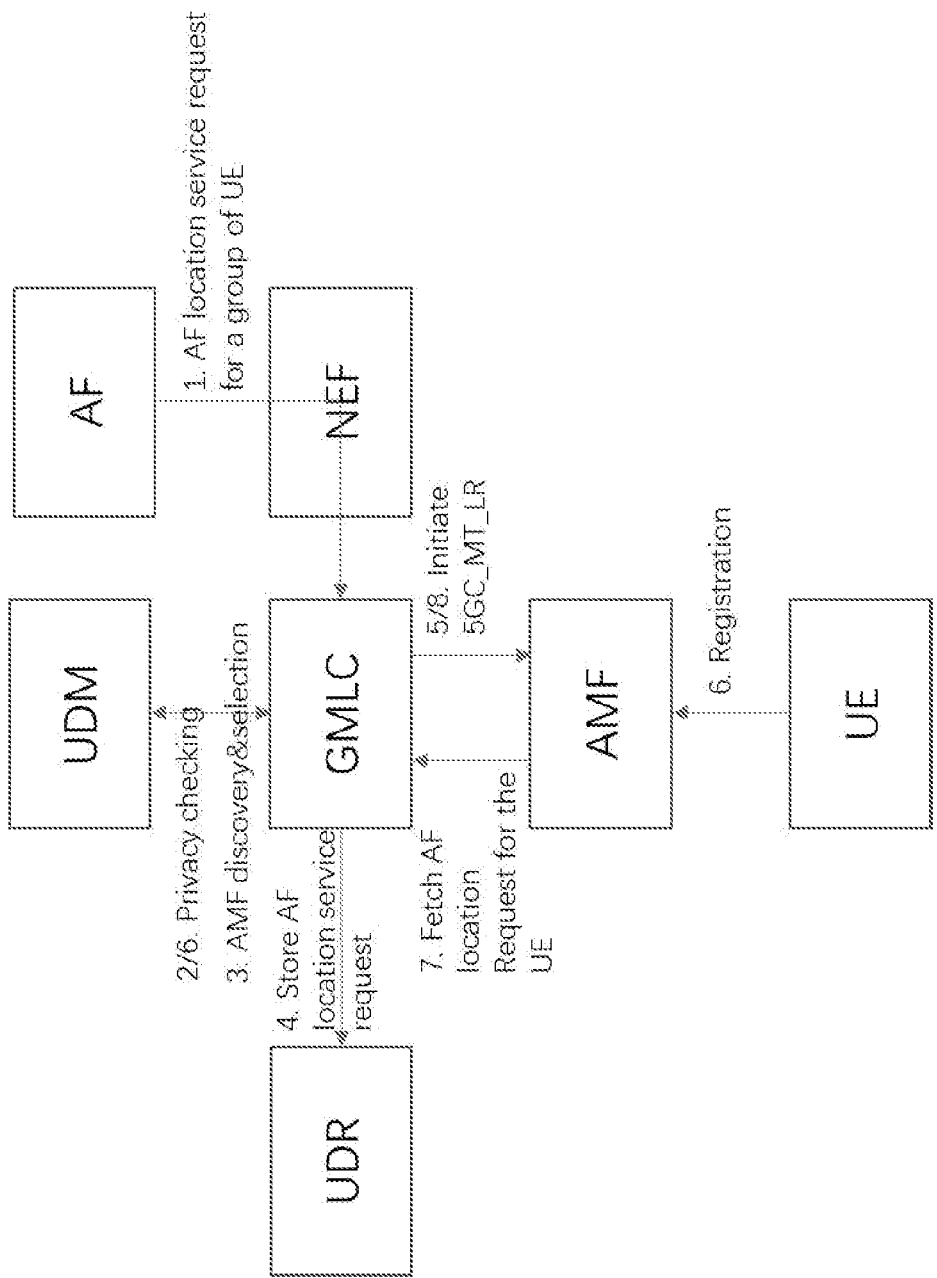
FIG. 10 illustrates an example of the steps performed by network functions of the system.

Reference is made to FIG. 10, which illustrates an example of steps that may be performed by the different network functions of the system according to embodiments of the application.

The steps 1 to 3 illustrated in FIG. 10 are substantially the same as those described above with respect to FIG. 8.

FIG. 10 additionally illustrates how the pending location requests are stored in memory of the system.

At step 4, the system is configured to, in response to determining that the at least one privacy setting indicates that location services are enabled for the at least one device, but that the at least one device is not registered on the network, store an indication of a pending location request. The stored indication comprises one or more associated requirements for the location service, such as QoS (Quality of Service) or GAD (Graphical Area Descriptor) shapes and client type. This information is stored in the UDR.

At step 5, the system is configured to initiate the location request procedure for at least one device that was determined to be registered on the network in step 3. Initiating the location request procedure for each device may comprise sending an instruction to the network function for the central control of location services (e.g. AMF or LMF) for the respective device. In response to the receipt of the instruction, the network function for the central control of location services may be configured to communicate with the respective device to determine the device location. In response to determining the device location, the system is configured to report the device location to the requesting client.

At step 6, a device that was determined in step 3 to not be registered on the network, registers on the network.

Additionally, at step 6, the system is configured to perform a second check of the privacy setting. This second check is made by the GMLC. The second check is made so as to ensure that the privacy setting corresponding to the subsequently registered device has not changed in the time since the first check was made.

At step 7, in response to determining that the device that was not registered on the network has registered on the network, and that the privacy setting indicates that location services are enabled for that device, the system is configured to access the pending request for the device that has subsequently registered on the network from memory. This may involve a fetch instruction being sent from the core access network function associated with the device to the UDR via the GMLC.

At step 8, the system is configured to, in response to determining from the second check that the privacy setting indicates that the location services are still enabled for the device that has subsequently registered, initiate the location request procedure for the device that was subsequently registered on the network in step 6.

Figure 11:
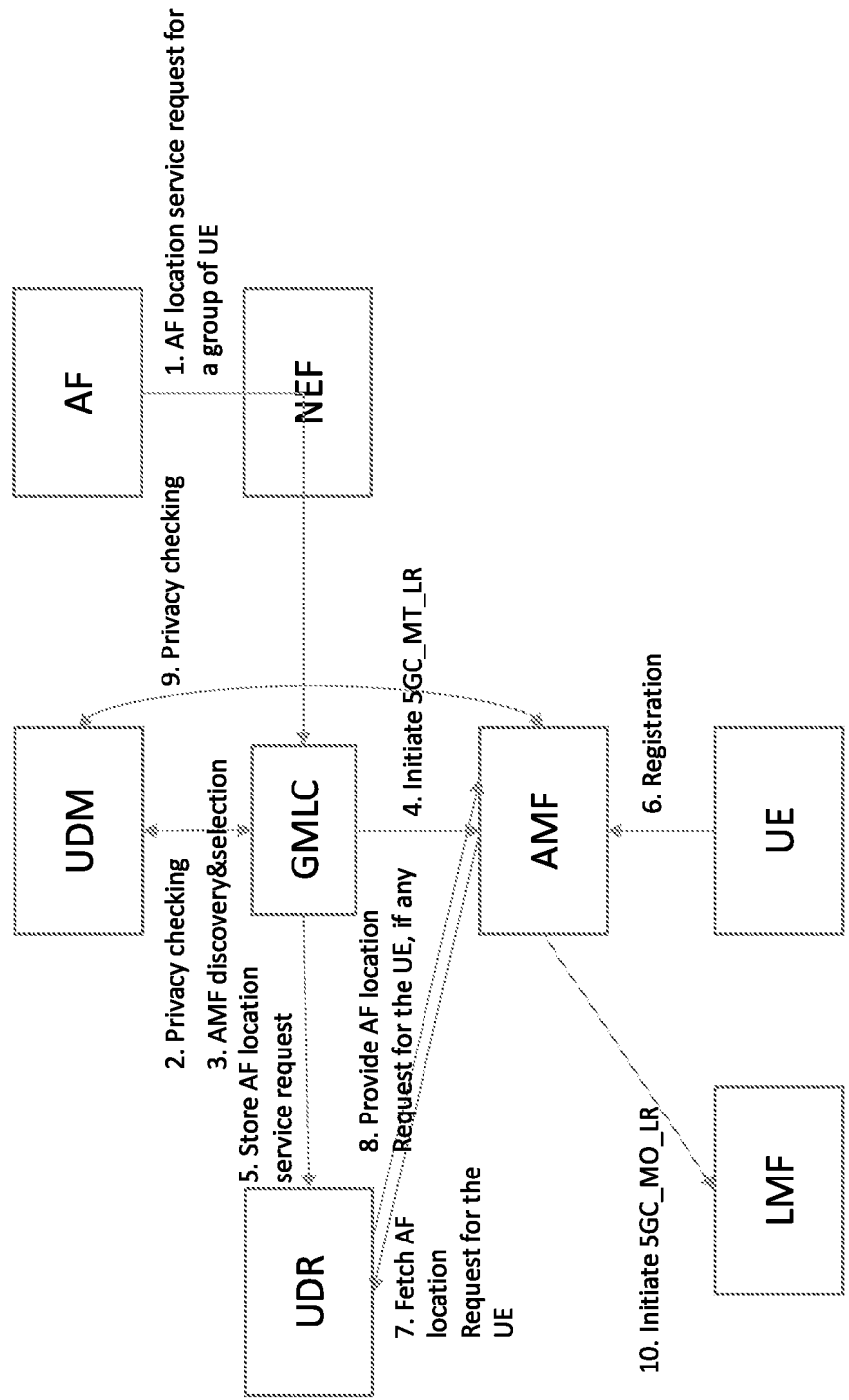
FIG. 11 illustrates an example of the steps performed by network functions of the system.

Reference is made to FIG. 11, which illustrates an example of steps that may be performed by the system according to embodiments of the application. FIG. 11 shows the different network functions that may perform these steps. However, it would be appreciated that this is an example only and that, in other examples, different network functions may perform the steps shown. FIG. 11 illustrates steps that may be performed in servicing a mobile originated service request.

At step 1, a location request for the devices of the group of devices is received at the system. The location request is received at the NEF and passed to the GMLC. Alternatively, the location request bypasses the NEF and is directly received by the GMLC.

At step 2, a first check of the at least one privacy setting is performed. The system may be configured to use the identification in the request to access the at least one privacy setting associated with the identification that is stored in a memory of the system. The system may convert the identification in the location request that is receive to an internal identification, which is then used to determine the privacy setting/s for the plurality of devices. The GMLC may use the identification to access the privacy setting/s stored in the UDM.

At step 3, if it is determined from the first check of the at least one privacy setting that the location services are enabled for at least one device, the system performs a check for each device for which location services are enabled to determine whether each device is registered on the network. Each device may be associated with a separate network function for core access (the AMF in this example). Performing the check for each device may comprise checking the status of the associated network function stored in the UDM to determine whether the respective device is registered on the network.

At step 4, the system is configured to initiate the location request procedure for at least one device that was determined to be registered on the network in step 3. Initiating the location request procedure for each device may comprise sending an instruction to the network function for the central control of location services (e.g. AMF or LMF) associated with the respective device. In response, to the receipt of the instruction, the network function for the central control of location services may be configured to communicate with the device to determine the device location. In response to determining the device location, the system is configured to report the device location to the requesting client.

At step 5, the system is configured to, in response to determining that the privacy setting/s indicate that location services are enabled for at least one device, but that this at least one device is not registered on the network, store an indication of a pending location request. This request is stored in the UDR.

At step 6, a device for which a pending request was stored subsequently registers on the network.

At step 7, in response to determining in step 6 that a device for which a pending request was stored has registered on the network, the system is configured to access the pending request for the device that has subsequently registered on the network from memory. This may involve a fetch instruction being sent from the core access network function associated with the device to the UDR.

At step 8, the pending location request is loaded from the memory of the system. In the example shown, the pending location request is provided from the UDR to the core network access function.

At step 9, the system is configured to perform a second check of the privacy setting corresponding to the subsequently registered device. The second check is made so as to ensure that the relevant privacy setting has not changed in the time since the first check was made. The second check is made by the core access function (i.e. the AMF) associated with the device for which a pending request has been loaded in step 8.

At step 10, in response to determining from the second check in step 9 that the privacy setting indicates that the location services are enabled for device, the system is configured to determine and report the location of the device subsequently registered on the system. The core access function associated with the device issues an instruction to the LMF to perform the initiation of the location request procedure in order to determine the location of the device.

Figure 12:
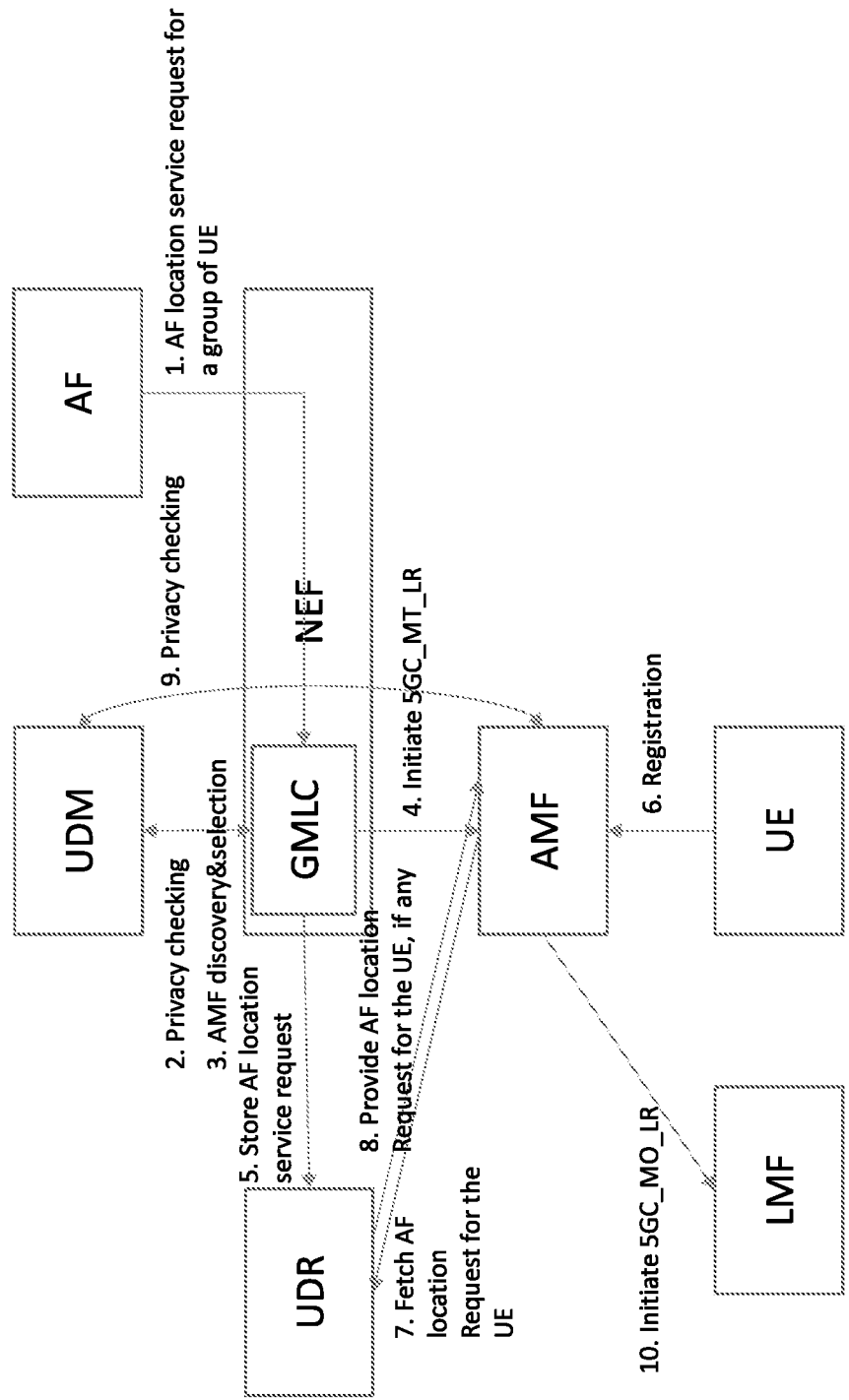
FIG. 12 illustrates an example of the steps performed by network functions of the system.

Reference is made to FIG. 12, which illustrates an example of steps that may be performed by the different network functions of the system according to embodiments of the application.

The steps illustrated in FIG. 12 are unless shown otherwise, the same as those described above with respect to FIG. 11. In this example, however, the GMLC is part of the NEF.

Figure 13:
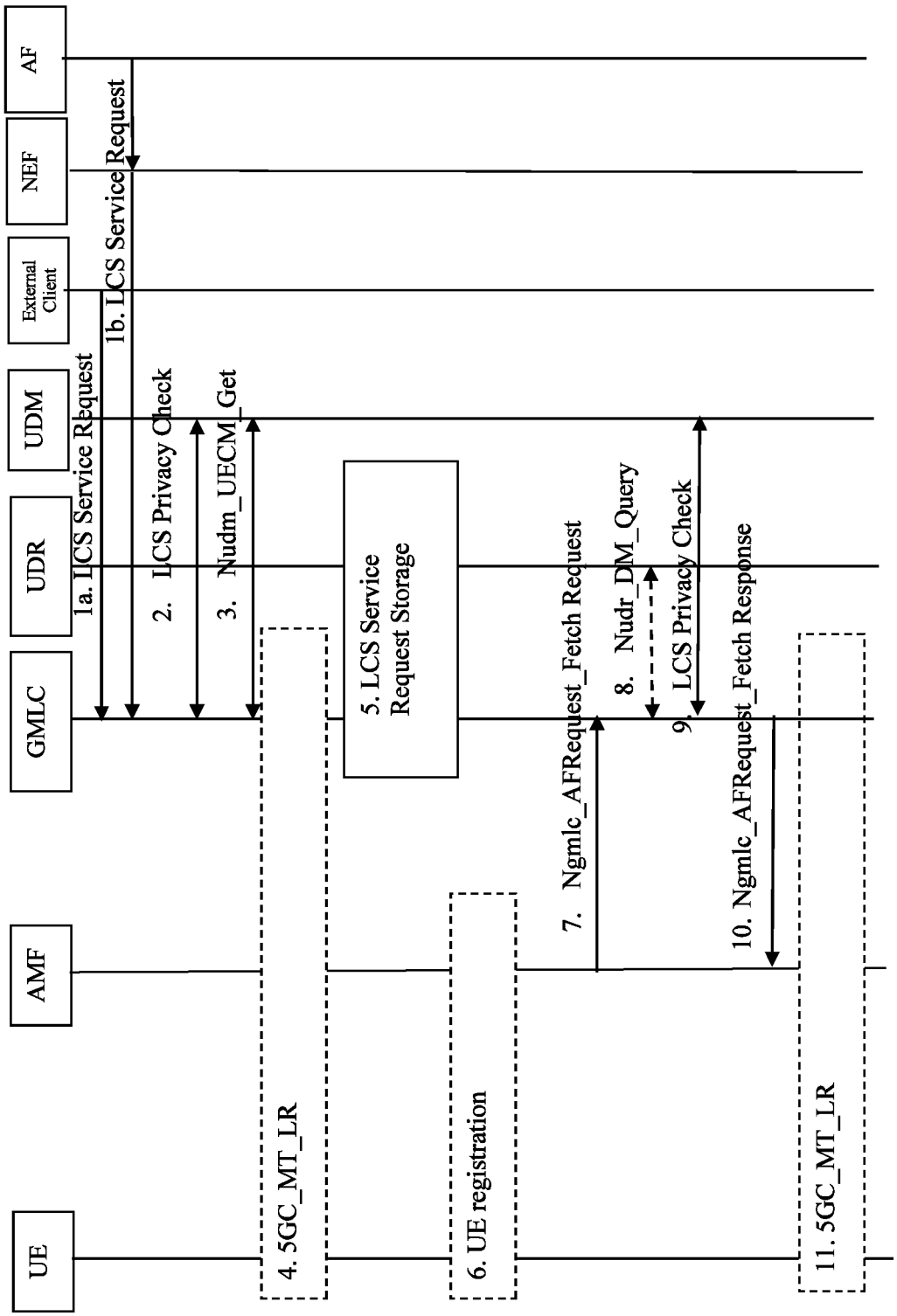
FIG. 13 illustrates an example message sequence diagram according to embodiments of the application.

Reference is made to FIG. 13, which is a message sequence diagram illustrating an example of the communications that may be performed between different network functions of the system according to embodiments of the application. It would be appreciated by the skilled person that the network functions are examples only and that in some examples different network functions may be used to perform the steps illustrated.

At step 1a, the location service request is received from a device (such as a device of the emergency services).

Alternatively or additionally, as shown in step 1b, the location service request is received from an application function of the system.

The location service request at step 1a or step 1b comprises an identification of the plurality devices for which location is requested. This identification may be a group ID or an indication of any device for a specific area or a specific network slice instance.

At step 2, the system is configured to use the identification to perform a first check of the at least one privacy setting associated with the plurality of devices.

At step 3, in response to determining that the first check indicates that the location services are enabled for at least one of the plurality of devices, the system determines the network addresses of the core network access functions serving the at least one device for which location services are enabled. In this step, GMLC invokes a Nudm_UECM_Get service operation towards the UDM of the target device to be located. The system uses the identification (e.g. group ID, location ID or network slice ID) from the location request to determine the core network access function for the at least one device. The UDM returns the network addresses of the current serving AMF. The UDM is aware of the serving AMF address based on device registration on an AMF. The UDM made aware of a serving GMLC address by the AMF upon device registration on an AMF.

At step 4, the GMLC initiates the mobile terminated location request procedure for those devices of the one or more devices for which an address was returned at step 3.

At step 5, if no serving AMF address is provided for the device at step 3, the GMLC stores the pending location request locally or in the UDR.

At step 6, at least one of the devices that was not previously registered on the network, is registered on the network.

At step 7, based on local configuration information, the core network access function send an instruction to the GMLC to fetch any pending location requests.

At step 8, the GMLC may fetch from the UDR any pending location requests.

At step 9, if any pending location request applies to the device, the GMLC checks the privacy setting/s associated with the device/s for which a pending request is retrieved in step 7. This may involve checking the single privacy setting associated with all of the plurality of devices.

At step 10, if the at least one privacy setting/s is such that the device/s that has subsequently registered may be located in response to the location request, the GMLC provides an indication to the AMF associated with the device/s is to be determined and reported. If the privacy setting/s is such that the device/s may not be located in response to the location request, the GMLC provides an indication to the AMF associated with the device/s that has subsequently registered that the location is not to be determined and reported.

At step 11, if it is determined that the location of the at least one device that has subsequently registered is to be determined and reported, the location determination procedure is initiated.

Figure 14:
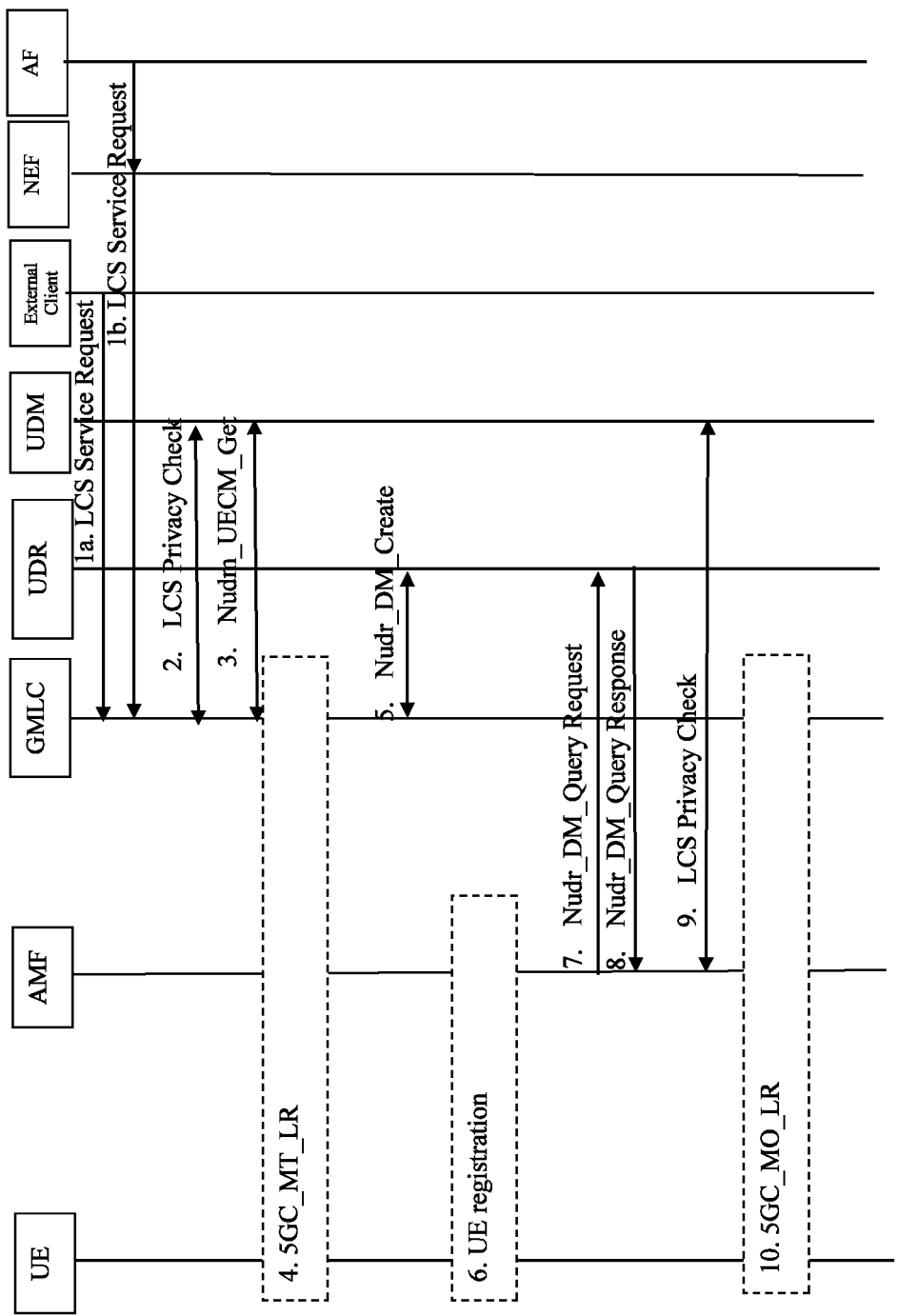
FIG. 14 illustrates an example message sequence diagram according to embodiments of the application.

Reference is made to FIG. 14, which illustrates a message sequence diagram showing the steps that may be performed by network functions of the system. It would be appreciated by the skilled person that the network functions are examples only and that in some examples different network functions may be used to perform the steps illustrated.

At step 1a/1b, the external location services client or the AF of the system sends a request to the GMLC for a location for the plurality of devices identified by an identifier, such as a group ID (which may be mapped by the NEF from external group ID to a group ID used within the network). The identifier may also be a location ID (e.g. gNB ID or cell ID) or Network Slice ID (e.g. S-NSSAI or NSI ID). The request may include the required QoS (Quality of Service), supported GAD (Graphical Area Description) shapes and client type. The NEF or GMLC authorizes the AF or the External Client for the usage of the location service.

At step 2, the GMLC invokes a Nudm_SDM_Get service operation towards the UDM for the group of UEs identified so as to determine the at least one privacy setting associated with the plurality of devices identified by the identifier in the request. The UDM returns the at least one privacy setting associated with the identifier for the plurality of devices. The GMLC checks the at least one privacy setting. If the at least one privacy setting indicates that the plurality of devices are not allowed to be located, step 3-4 are skipped.

At step 3, the GMLC invokes a Nudm_UECM_Get service operation towards the UDM of the one or more devices that are allowed to be located with identification of the one or more devices. The UDM returns the network addresses of the currently serving AMF/s for those one or more devices.

The UDM is aware of the serving AMF address based on the device registration on an AMF. The UDM is made aware of a serving GMLC address by the AMF at UE registration on an AMF.

At step 4, the GMLC initiates the location request procedure.

At step 5, if, for a device, no serving AMF address is provided for the one or more devices (i.e. because the device is not registered on the network), the GMLC stores the pending location request using a Nudr_DM_Create service operation.

At step 6, a device of the plurality of devices registers on the network, and the core network access function (i.e. the AMF) is allocated to serve the at least one device that has subsequently registered on the network.

At step 7, based on the stored local configuration, the core network access function may fetch from the UDR, using a Nudr_DM_Query service operation, any pending location request associated with the device that registered in step 6.

At step 8, in response to the fetch, the pending location request is fetched and provided to the AMF along with the serving GMLC's address.

At step 9, the AMF checks the privacy setting for the device associated with the pending location request that was fetched in step 8 from the UDM. If the privacy setting indicates that the one or more devices may not be located, then step 10 is skipped.

At step 10, if the privacy setting is such that the device is allowed to be located, the AMF initiates the location determining procedure of the device that has subsequently been registered and reports the location of the subsequently registered device to the GMLC.

The skilled person would appreciated that the concepts of the examples discussed above with reference to FIGS. 8 to 14 are capable of combination.

Figure 15:
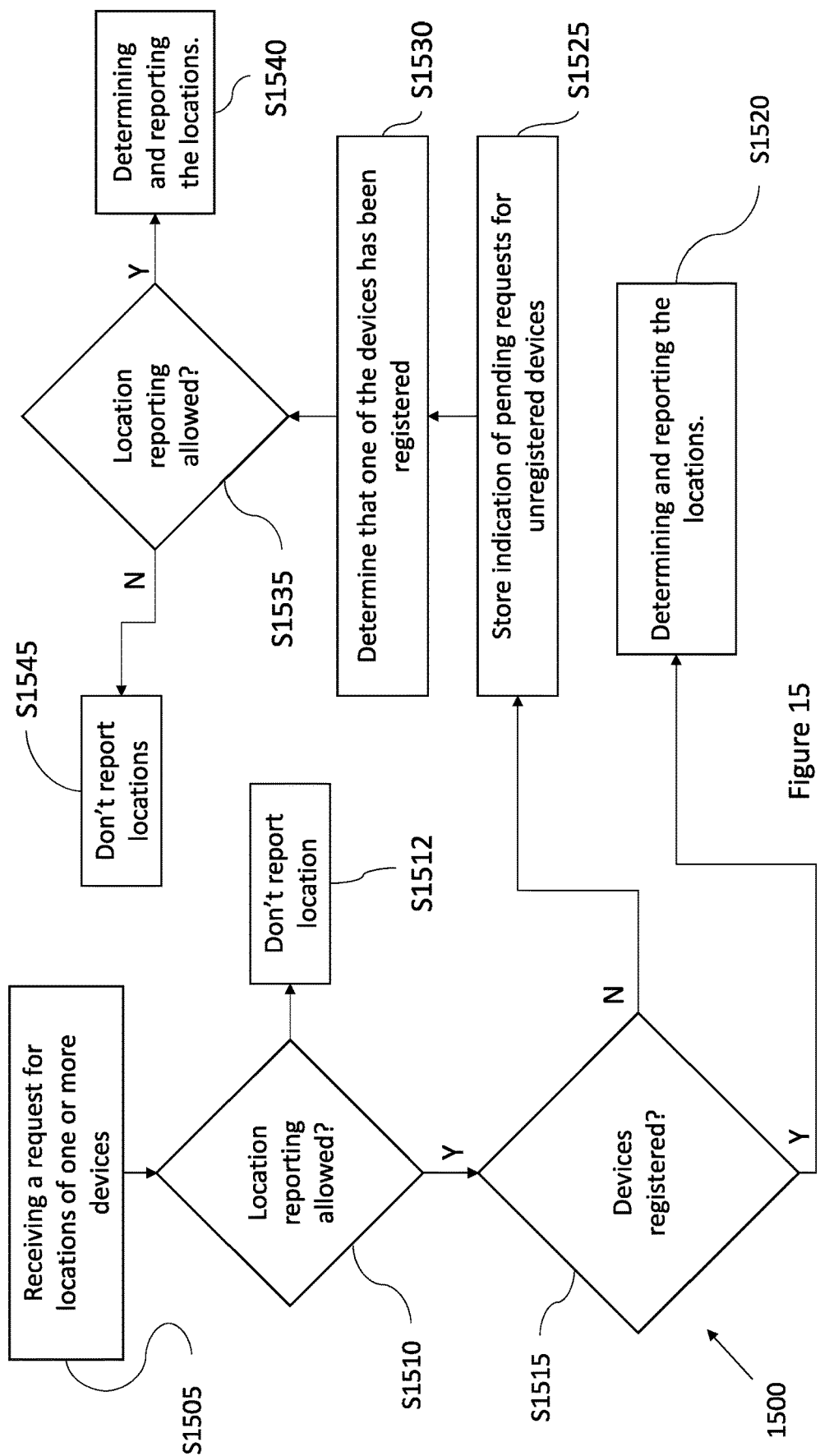
FIG. 15 illustrates an example method according to embodiments of the application.

Reference is made to FIG. 15, which illustrates an example method 1500 according to embodiments of the application.

At S1505, a location request for the locations of the plurality of devices is received. The location request comprising an identification of the plurality of devices.

At S1510, a first check of the at least one privacy setting is carried out to determine whether location reporting is allowed for each of the plurality of devices.

At S1512, if it is determined that location reporting is not allowed for the at least one of the plurality of devices, the location is not reported for this at least one device.

At S1515, if it is determined that location reporting is allowed for at least one of the plurality of devices, it is determined for each of the at least one device for which location reporting is allowed, whether that device is registered on the network.

At S1520, the location is determined and reported for those devices that have been determined to be registered on the network.

At S1525, an indication of pending requests for those devices which are determined at S1515 to not be registered on the network is stored by the system.

At S1530, it is determined that one of the devices that was determined at S1515 to not be registered has been registered.

At S1535, a second check of the at least one privacy setting is performed so as to determine whether or not location reporting is allowed for the device subsequently registered.

At S1540, in response to determining from the second check that the location reporting is allowed for the device registered at S1535, the system is configured to service the pending location request that was stored for the device registered at S1535 so as to determine and report the location for that device.

At S1545, in response to determining from the second check that the location reporting is not allowed for the device registered at S1535, the system is configured to not determine and report the locations for that device.

The system for implementing embodiments of the application comprises required data processing apparatus and functions that may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to FIG. 15 may be performed by one or more processors in conjunction with one or more memories.

An appropriately adapted computer program code product or products may be used for implementing the embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Figure 4:
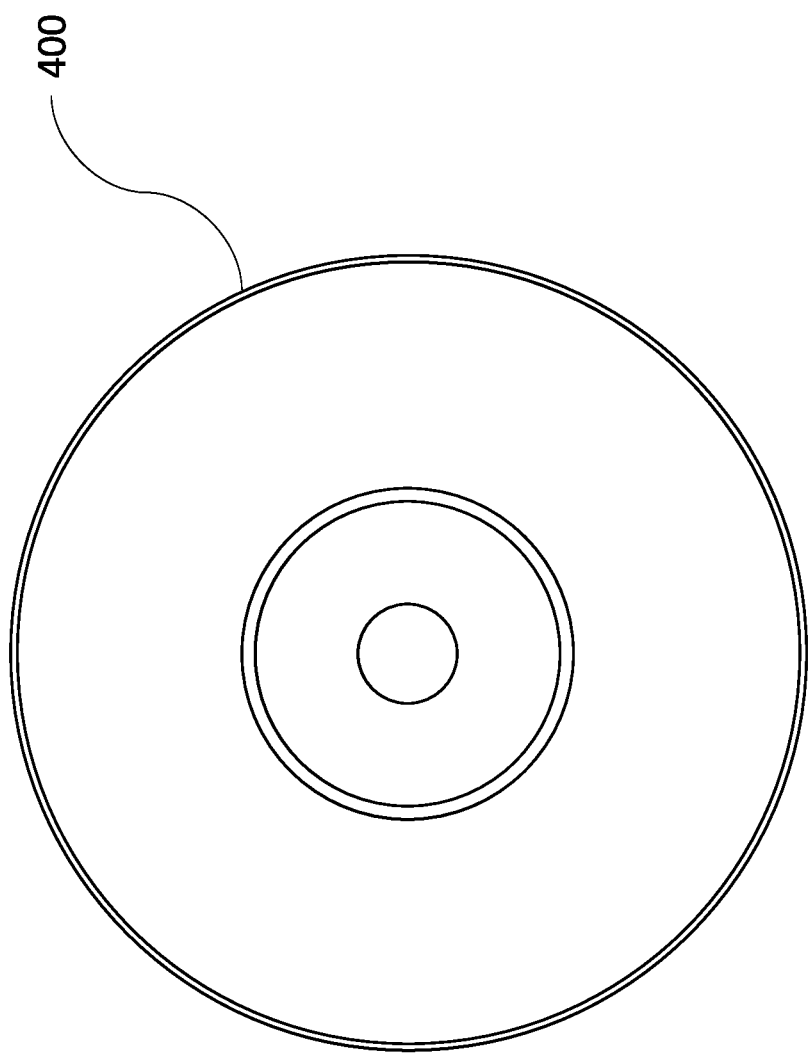
FIG. 4 illustrates an example of a non-transitory computer readable medium.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. An example of a non-transitory computer readable medium 400 is shown in FIG. 4. The non-transitory computer readable medium 400 may be a CD or DVD.

It is noted that whilst embodiments have been described in relation to certain architectures, similar principles can be applied to other systems. Therefore, although certain embodiments were described above by way of example with reference to certain exemplifying architectures for wireless networks, technologies and standards, embodiments may be applied to any other suitable forms of communication systems than those illustrated and described herein. It is also noted that different combinations of different embodiments are possible. It is also noted herein that while the above describes exemplifying embodiments of the invention, there are several variations and modifications which may be made to the disclosed solution without departing from the spirit and scope of the present invention.

What is claimed is:

1. A system comprising at least one processor and at least one memory storing computer program code, wherein the at least one memory and the computer program code are configured, with the at least one processor, to cause the system to:
    receive a request for locations of a plurality of devices for communicating in a network, said request comprising an identifier for identifying said plurality of devices;
    check whether each of two or more devices of said identified plurality of devices has been registered on the network;
    in response to determining that at least one device of the two or more devices has been registered on the network, determine and report at least one location for the at least one device determined to be registered on the network; and
    in response to determining that at least one device of the two or more devices has not been registered on the network, store in memory at least one indication of at least one pending request for at least one location of the at least one device not registered on the network.

2. A system as claimed in claim 1, wherein the identifier comprises at least one of:
    a group identifier identifying a group comprising the plurality of devices;
    a location identifier identifying an area comprising the plurality of devices; and
    a network slice identifier identifying a network slice comprising the plurality of devices.

3. A system as claimed in claim 1, wherein the at least one memory and the computer program code are also configured, with the at least one processor, to cause the system, in response to determining that a device of the at least one device for which a pending request was stored has subsequently been registered on the network, to determine and report a location for the device subsequently registered on the network.

4. A system as claimed in claim 3, wherein the at least one memory and the computer program code are configured, with the at least one processor, to cause the system to determine and report the location for the device subsequently registered on the network by fetching the respective pending request from the memory and servicing the respective pending request.

5. A system as claimed in claim 1, wherein the at least one memory and the computer program code are also configured, with the at least one processor, to cause the system to:
    use the identifier to identify at least one privacy setting associated with the plurality of devices; and
    perform a first check of the at least one privacy setting, wherein the at least one memory and the computer program code are configured, with the at least one processor, to cause the system to determine and report of the at least one location for the at least one device registered on the network is in response to determining from the first check that the at least one privacy setting allows location reporting for the at least device registered on the network.

6. A system as claimed in claim 1, wherein the at least one memory and the computer program code are also configured, with the at least one processor, to cause the system to:
    use the identifier to identify at least one privacy setting associated with the plurality of devices; and
    perform a first check of the at least one privacy setting, wherein the at least one memory and the computer program code are configured, with the at least one processor, to cause the system to check whether each of the two or more devices of said identified plurality of devices has been registered on the network in response to determining from the first check that the at least one privacy setting allows location reporting for the two or more devices.

7. A system as claimed in claim 5, wherein the at least one memory and the computer program code are also configured, with the at least one processor, to cause the system to perform a second check of the at least one privacy setting associated with the plurality of devices and, in response to determining that a device of the at least one device for which a pending request was stored has subsequently been registered on the network and in response to determining from the second check that the at least one privacy setting allows location reporting for the device subsequently registered on the network, to determine and report a location for the device subsequently registered on the network.

8. A system as claimed in claim 5, wherein the at least one privacy setting comprises a single privacy setting that applies to all of the plurality of devices.

9. A system as claimed in claim 5, wherein the at least one privacy setting comprises a plurality of privacy settings, each of which applies to at least one of the plurality of devices.

10. A system as claimed in claim 1, wherein the at least one pending request comprises a periodic request for locations of the at least one device not registered on the network.

11. A method comprising:
receiving a request for locations of a plurality of devices for communicating in a network, said request comprising an identifier for identifying said plurality of devices;
checking whether each of two or more devices of said identified plurality of devices has been registered on the network;
in response to determining that at least one device of the two or more devices has been registered on the network, determining and reporting at least one location for the at least one device determined to be registered on the network; and
in response to determining that at least one device of the two or more devices has not been registered on the network, storing in memory at least one indication of at least one pending request for at least one location of the at least one device not registered on the network.

12. A non-transitory computer readable medium comprising program instructions for causing an apparatus to perform at least:
receiving a request for locations of a plurality of devices for communicating in a network, said request comprising an identifier for identifying said plurality of devices;
checking whether each of two or more devices of said identified plurality of devices has been registered on the network;
in response to determining that at least one device of the two or more devices has been registered on the network, determining and reporting at least one location for the at least one device determined to be registered on the network; and
in response to determining that at least one device of the two or more devices has not been registered on the network, storing in memory at least one indication of at least one pending request for at least one location of the at least one device not registered on the network.

13. A method as claimed in claim 11, wherein the identifier comprises at least one of:

a group identifier identifying a group comprising the plurality of devices;
a location identifier identifying an area comprising the plurality of devices; and
a network slice identifier identifying a network slice comprising the plurality of devices.

14. A method as claimed in claim 11, further comprising, in response to determining that a device of the at least one device for which a pending request was stored has subsequently been registered on the network, determining and reporting a location for the device subsequently registered on the network.

15. A method as claimed in claim 14, wherein determining and reporting the location for the device subsequently registered on the network comprises fetching the respective pending request from the memory and servicing the respective pending request.

16. A method as claimed in claim 11, further comprising:
using the identifier to identify at least one privacy setting associated with the plurality of devices; and
performing a first check of the at least one privacy setting, wherein determining and reporting of the at least one location for the at least one device registered on the network is performed in response to determining from the first check that the at least one privacy setting allows location reporting for the at least device registered on the network.

17. A method as claimed in claim 11, further comprising:
using the identifier to identify at least one privacy setting associated with the plurality of devices; and
performing a first check of the at least one privacy setting, wherein checking whether each of the two or more devices of said identified plurality of devices has been registered on the network is performed in response to determining from the first check that the at least one privacy setting allows location reporting for the two or more devices.

18. A method as claimed in claim 16, further comprising performing a second check of the at least one privacy setting associated with the plurality of devices and, in response to determining that a device of the at least one device for which a pending request was stored has subsequently been registered on the network and in response to determining from the second check that the at least one privacy setting allows location reporting for the device subsequently registered on the network, determining and reporting a location for the device subsequently registered on the network.

19. A method as claimed in claim 16, wherein the at least one privacy setting comprises a single privacy setting that applies to all of the plurality of devices.

20. A method as claimed in claim 16, wherein the at least one privacy setting comprises a plurality of privacy settings, each of which applies to at least one of the plurality of devices.

* * * * *

UNITED STATES PATENT AND TRADEMARK OFFICE
CERTIFICATE OF CORRECTION

PATENT NO. : 11,729,599 B2
APPLICATION NO. : 17/280010
DATED : August 15, 2023
INVENTOR(S) : Yang Shen et al.

It is certified that error appears in the above-identified patent and that said Letters Patent is hereby corrected as shown below:

In the Claims

In Column 22, Line 42, Claim 5, delete "network is in" and insert -- network in --, therefor.

Signed and Sealed this
Thirteenth Day of February, 2024

Katherine Kelly Vidal
*Director of the United States Patent and Trademark Office*